United States Patent [19]
Yamashita et al.

[11] Patent Number: 5,180,180
[45] Date of Patent: Jan. 19, 1993

[54] WHEEL SUPPORTING APPARATUS

[75] Inventors: Mitugu Yamashita; Mutsumi Kawamoto, both of Tokyo; Hidemitsu Inagaki, Nishio, all of Japan

[73] Assignee: Aisin AW Co., Ltd., Japan

[21] Appl. No.: 690,835

[22] Filed: Apr. 24, 1991

[51] Int. Cl.⁵ .............................................. B60G 3/00
[52] U.S. Cl. .................... 280/96; 280/668; 280/691; 180/65.5; 180/253
[58] Field of Search ............... 280/95.1, 96, 668, 691, 280/693; 180/65.5, 253

[56] References Cited

U.S. PATENT DOCUMENTS

| | | | |
|---|---|---|---|
| 2,600,885 | 6/1952 | Kopfli | 280/96 |
| 4,749,205 | 6/1988 | Takahashi et al. | 280/95.1 |
| 4,878,688 | 11/1989 | Kubo | 280/691 X |
| 5,026,090 | 6/1991 | Sekino | 280/691 X |
| 5,048,859 | 9/1991 | Nishikuma et al. | 280/668 |
| 5,048,860 | 9/1991 | Kanai et al. | 280/691 |
| 5,087,229 | 2/1992 | Hewko et al. | 180/65.5 X |

FOREIGN PATENT DOCUMENTS

| | | | |
|---|---|---|---|
| 306625 | 3/1989 | European Pat. Off. | 280/693 |
| 598588 | 12/1925 | France | 280/96 |
| 218209 | 9/1987 | Japan | 280/96 |
| 190508 | 7/1989 | Japan | 280/691 |
| 257670 | 10/1989 | Japan | 280/95.1 |
| 2100201 | 12/1982 | United Kingdom | 280/668 |

Primary Examiner—D. Glenn Dayoan
Assistant Examiner—Boris Milef
Attorney, Agent, or Firm—Lorusso & Loud

[57] ABSTRACT

In a wheel supporting apparatus, a strut type suspension has an upper end supported by a vehicle frame and a lower end supported by the vehicle frame through a lower arm. The wheel supporting apparatus comprises a wheel supporting part provided at the lower end of the strut type suspension, and supporting the wheel to allow relative rotation to the strut type suspension. A center axis of the strut type suspension is disposed parallel to a rotation axis of the relative rotation of the wheel.

6 Claims, 3 Drawing Sheets

WHEEL SUPPORTING APPARATUS

BACKGROUND OF THE INVENTION

1. Field of the Invention

The present invention relates to a wheel supporting apparatus capable of a smooth and small turn at a large steering angle and having a large rigidity against a bending moment at a wheel supporting part.

2. Description of the Prior Art

In general, four wheels are required to have a same turning center for a smooth turn of a four-wheeled vehicle. For this purpose, conventional steering mechanisms have employed steering link mechanisms provided with, for instance, knuckle arms and tie rods.

In this steering link mechanism, as shown in FIG. 3, tie rods 01 are rotatably connected at tie rod ends 01a to ends of knuckle arms 02, of which other ends are connected to king pins 03 of right and left wheels, respectively. Each tie rod 01 in this steering mechanism is adapted to be moved laterally or in right and left directions by a steering torque applied from a steering wheel through, for instance, a rack-and-pinion gear, a worm gear or a hydraulic cylinder so as to turn the knuckle arm 02. In this manner, the right and left wheels are laterally steered.

In many conventional automobiles, as shown in FIG. 4, each front wheel 04 is supported by a suspension 05 of a strut type. In this arrangement, a knuckle arm 6 which forms a part of a steering mechanism for the front wheel 4 is formed integrally with a strut 05a, so that the strut 05a is turned together with it when the wheel 4 is steered for turning the vehicle, However, in such steering mechanism, the tie rod 01 and the knuckle arm 02 may be rectilinearly aligned to each other, as shown in FIG. 3, in which case further steering operation for the wheels cannot be carried out. This condition is a limit of allowable wheel steering operation and a limit value of a steering angle $\alpha$ is generally about 45 degrees. The limit in the wheel steering will restrict the steering operation for small turns.

Further, if the apparatus were designed to set the steering angle $\alpha$ of the wheels to a value exceeding the limit, e.g., 90 degrees, such a problem would be caused that the wheels could not be driven by a driving power from a driving source provided on a vehicle body at the steering angle $\alpha$ of 90 degrees.

In view of the above, the applicant has already filed the Japanese Patent Application No. 63-165498 for a steering mechanism and a vehicle provided with the same, in which the above problems are resolved.

In the steering mechanism and the vehicle provided with the same disclosed in this patent application, the steering angle of the steering wheel is mechanically transmitted to the wheels through a link mechanism in such a manner that the velocity of the steering angle is increased by a velocity increasing gear provided at the vehicle frame, and driving motors are individually associated with the respective wheels.

Further, in the wheel supporting structures in this patent application, a steering shaft is fixed to a casing of a wheel driving motor associated with each wheel, and the steering shaft is supported by the vehicle frame to be rotatable around a center axis of the steering shaft.

Usage of the velocity increasing gear for each wheel enables steering operation of the wheel over 90 degrees around the steering shaft as well as rotational driving by the driving motors at a steering angle of 90 degrees.

The steering mechanism thus employing the velocity increasing gear may be used for each of the front and rear wheels, in which case the front wheels as well as the rear wheels may be steered at 90 degrees, which enables a small turn and a parallel movement in a lateral direction.

In this wheel supporting structure, there is a considerably long distance between a wheel grounding point and a point at which the steering shaft is supported by the vehicle frame. Therefore, when the wheel receives forces in the lateral and longitudinal directions during the steering operation and others, a large moment is generated, and a bending force caused by this bending moment is concentrated in the supporting part of the vehicle frame and the steering shaft. For this reason, the supporting part of the vehicle frame and the steering shaft may not have sufficient rigidity against this bending force.

Accordingly, it is an object of the invention to provide a wheel supporting apparatus, overcoming the above-noted problems, in which a large steering angle can be set, a small turn and a parallel movement can be smoothly and surely achieved, and further a sufficient rigidity can be obtained against bending forces which is caused by a bending force in a longitudinal direction, i.e., forward and backward directions, applied to the wheels.

SUMMARY OF THE INVENTION

Accordingly, a wheel supporting apparatus of the invention of claim 1 in which, for instance, with reference to FIGS. 1 and 2, a strut type suspension (2) has an upper end supported by a vehicle frame (1) and a lower end supported by said vehicle frame (1) through a lower arm (5), comprises a wheel supporting part (7) provided at the lower end of said strut type suspension (2), and supporting said wheel (32 or 33) to allow relative rotation to said strut type suspension (2).

A wheel supporting apparatus of the invention of claim 2 has features, in addition to those of the invention of claim 1, that a center axis (c) of the strut type suspension (2) is disposed parallel to a rotation axis (b) of said relative rotation of said wheel (32 or 33).

A wheel supporting apparatus of the invention of claim 3 has features, in addition to those of the invention in claim 1 or 2, that said wheel (32 or 33) is connected to a steering mechanism (13) through a velocity increasing gear (25) disposed at said wheel supporting part (7).

Further, a wheel supporting apparatus of the invention of claim 4 has features, in addition to those of the invention in claim 3, that said velocity increasing gear (25) is formed of an internal gear wheel (10) connected to said steering mechanism (13) and an external gear wheel (22) connected to said wheel (32 or 33) and meshing with said internal gear wheel (10).

According to the invention of claim 1 having the above structures, since the wheel supporting part (7) is provided at the lower end of the strut type suspension (2) and supports said wheel (32 or 33) to allow relative rotation to said strut type suspension (2), a distance between a wheel grounding point (o) and the wheel supporting part (7) is reduced. Therefore, the bending force which is caused by the forces applied to the wheels (32 and 33) in the lateral and longitudinal directions can be reduced, and the wheel supporting part (7) can have great rigidity.

In the invention of claim 2, since it has features in addition to those of the invention in claim 1, that the center axis (c) of the strut type suspension (2) is disposed parallel to a rotation axis (b) of said relative rotation of said wheel (32 or 33), road clearance can be reduced.

In the invention of claim 3, since it has features in addition to those of the invention in claim 1 or 2, that the wheel (32 or 33) is connected to a steering mechanism (13) through the velocity increasing gear (25) disposed at said wheel supporting part (7), steering angle of the steering wheel is transmitted to the wheels (32 and 33) after the velocity thereof is increased by the velocity increasing gear (25). Thus, the wheels (32 and 33) can be steered at 90 degrees or more. Therefore, the wheel supporting apparatus thus constructed may be individually arranged at each of the front and rear wheels, in which case a small turn as well as a parallel movement in a lateral direction can be allowed. Further, since the velocity increasing gear (25) is arranged at the lower end of the strut type suspension (2), the velocity increasing gear (25) is prevented from interfering with the vehicle frame (1) which may be caused by elastic movement of the suspension (2). Therefore, with respect to the internal and external wheels (10 and 22) of the velocity increasing gear (25), it is not necessary to give much consideration to a vertical clearance between the vehicle frame (1) and them. This enables further reduction of the road clearance.

In the invention of claim 4, since said velocity increasing gear (25) is formed of the internal gear wheel (10) connected to said steering mechanism (13) and the external gear wheel (22) connected to said wheel (32 or 33) and meshing with said internal gear wheel (10), the velocity increasing gear (25) can be advantageously compact and the non-suspended weight can be reduced. Therefore, the velocity increasing gear (25) can be disposed in a small space between the suspension (2) and the wheel (32 or 33) with a large degree of freedom. Further, owing to the reduction of the non-suspended weight, comfort is improved.

It should be noted that reference numbers are allotted to the above described structures and components only for reference to the drawings, and are not intended to restrict the invention in any meanings.

These and other objects and features of the invention will become more apparent from the following description of preferred embodiments with reference to the accompanying drawings.

DETAILED DESCRIPTION OF THE PREFERRED EMBODIMENTS

Figure 1:
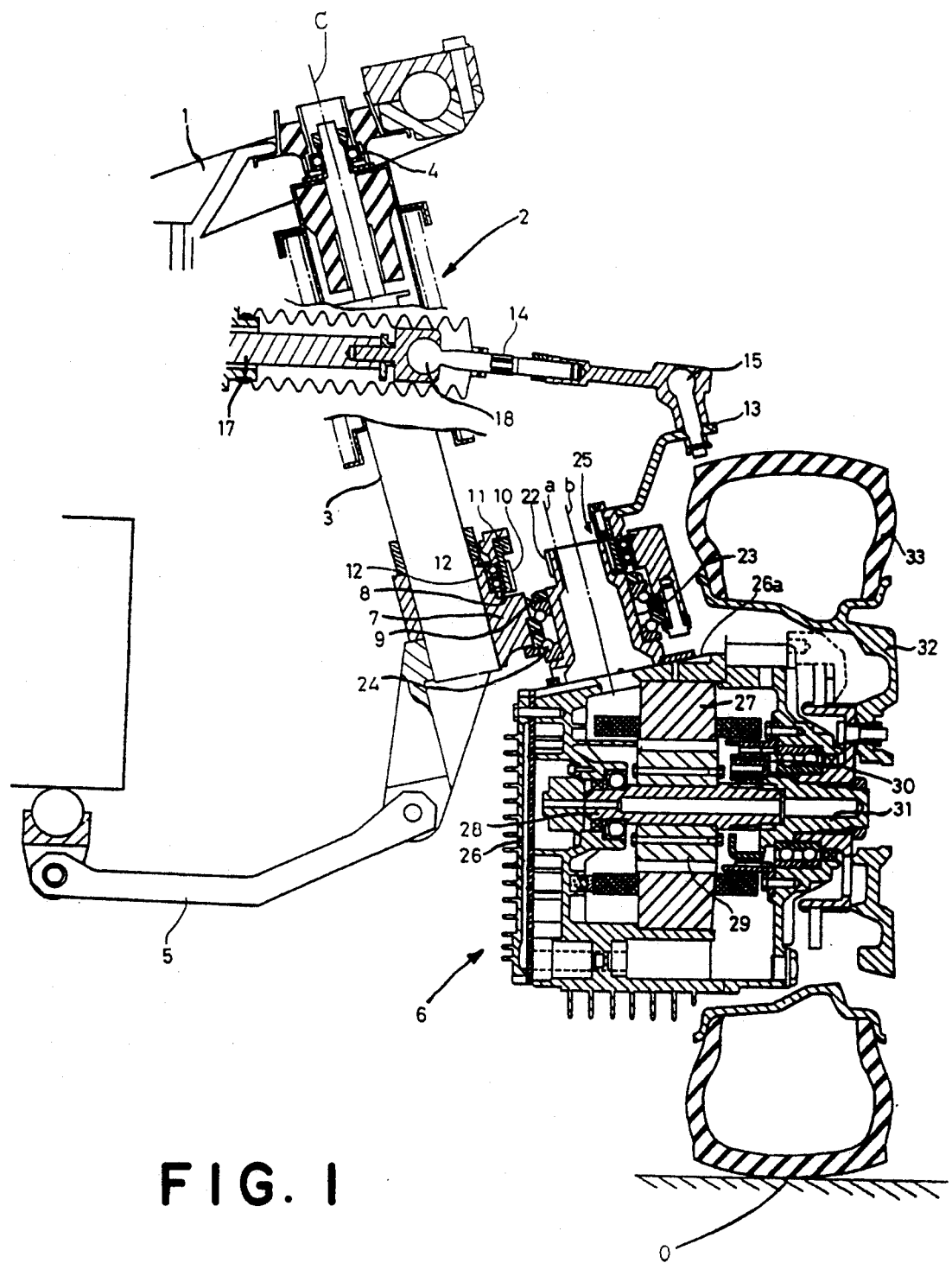
FIG. 1 is a cross section showing an embodiment of a wheel supporting apparatus of the invention.

Referring to FIG. 1, a vehicle frame 1 supports an upper end of a strut 3 of a strut type suspension 2 through a bearing 4. A lower end of strut 3 is pivotably supported on the vehicle frame 1 through a lower arm 5. The strut 3 is provided at its lower end with a support or supporting part 7 for supporting a wheel motor 6. The support 7 is provided with a pair of upper and lower apertures 8 and 9 which are deviated from each other and are substantially parallel to the strut 3. A first cylindrical member 11 having internal teeth 10 is supported in the upper aperture 8 through a bearing 12 to be rotatable around a center axis a of the upper aperture 8.

A knuckle arm 13 is connected to an upper end of the first cylindrical member 11, and a tie rod 14 is connected to the knuckle arm 13 through a universal joint 15. As clearly shown in FIG. 2, the tie rod 14 is connected through a universal joint 18 to a relay rod 17 which is provided at a predetermined position with a rack 16. The rack 16 on the relay rod 17 meshes with a pinion gear 20 arranged at an end of a steering shaft 19, which is connected at the other end to a steering wheel 21. A link mechanism in a steering mechanism is formed of the knuckle arm 13, tie rod 14, universal joint 15, rack 16, relay rod 17, universal joint 18 and pinion gear 20.

The lower aperture 9 in the support 7 receives and supports a second cylindrical member 23 provided at its upper end with external teeth 22 through a double angular thrust ball bearing 24 to be rotatable around a center axis b of the lower aperture 9. The external teeth 22 of the second cylindrical member 23 mesh with the internal teeth 10 on the first cylindrical member 11. These internal teeth 10 and external teeth 22 form a velocity increasing gear 25. Thus, the velocity increasing gear 25 is arranged at the lower end of the strut 3. The double angular thrust ball bearing 24 is adapted to bear a thrust applied to the second cylindrical member 23.

A motor casing 26 of the wheel motor 6 is attached to a lower end of the second cylindrical member 23. In this arrangement, a mounting surface 26a of the motor casing 26 for the second cylindrical member 23 is formed by an inclined surface perpendicular to the center axis b of the cylindrical body. The motor casing 26 houses a stator 27 fixed thereto, a rotor 29 fixed to a motor rotary shaft 28, a planetary reduction gear 30 and others. The stator 27, motor rotary shaft 28 and rotor 29 form a driving motor for the wheel.

An end of the motor rotary shaft 28 is fitted to an end of a coaxial output shaft 31. The planetary reduction gear 30 is arranged at fitted portions of the shafts 28 and 31 so as to transmit a power from the motor rotary shaft 28 through the planetary reduction gear 30 to the output shaft 31 after reducing the speed. The other end of the output shaft 31 is fixed to a wheel assembly including a wheel 32 and a tire 33. In this manner, the wheel motor 6 is constructed to have a combined structure of the driving motor and the wheel assembly. This wheel motor 6 can rotate and drive the wheel even when the wheel is steered at an angle of 90 degrees by the steering mechanism. In these structures, the center axis b of the second cylindrical member 23 forms a rotation axis for steering each of the wheels 32 and 33, and this axis b is disposed parallel to a center axis c of the strut type suspension 2.

Figure 2:
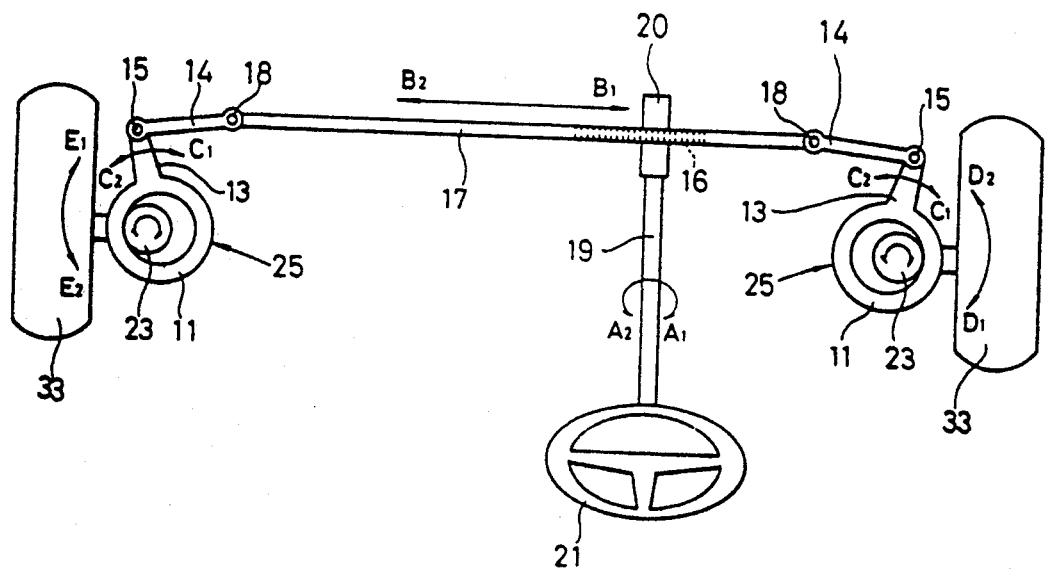
FIG. 2 is a schematic view of a steering mechanism associated to the wheel supporting apparatus in FIG. 1.
Figure 3:
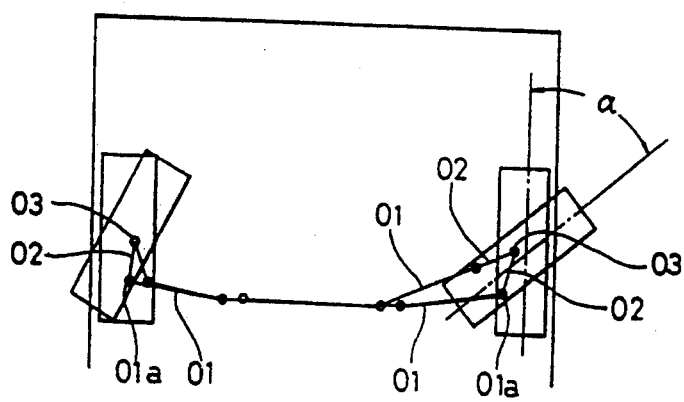
FIG. 3 is a schematic view illustrating a conventional steering mechanism.
Figure 4:
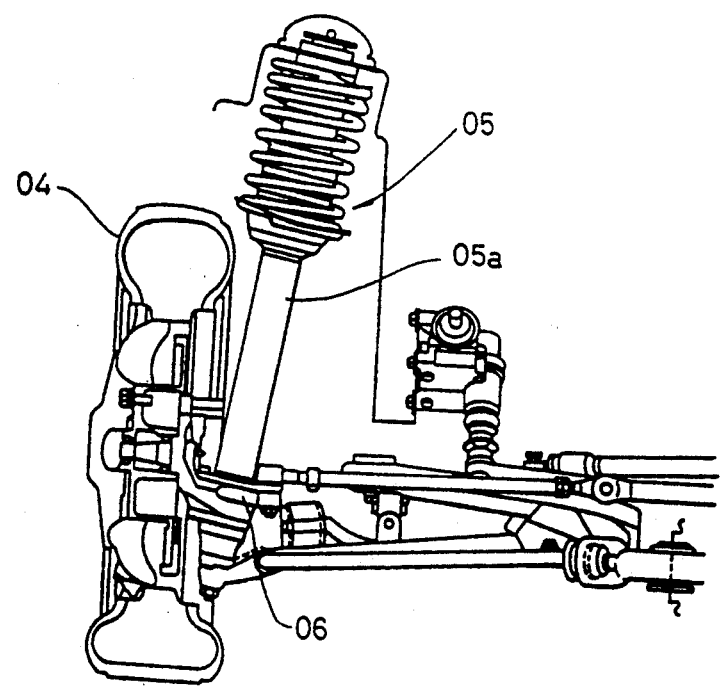
FIG. 4 is a view illustrating a conventional suspension.

As shown in FIG. 2, the right and left wheels are associated to same structures which are laterally symmetrical and include the wheel motors 6, velocity increasing gears 25, suspensions 2 and link mechanisms thus arranged, respectively. In these structures, the right and left tie rods 14 are connected together by the one relay rod 17.

The operation of the invention is as follows:

When the steering wheel 21 is turned right or clockwise to steer the right and left wheels in the right direction, it moves the relay rod 17 in the right direction $B_1$ through the pinion gear 20 and the rack 16. The relay rod 17 thus moved turns the right and left knuckle arms 13 in the right direction $C_1$ through the right and left tie rods 14. Each knuckle arm 13 thus turned causes the first and second cylindrical members 11 and 23 at the right and left sides to turn in the same right direction. In this operation, each velocity increasing gear 25 increases the turning velocity of the second cylindrical member 23 relative to that of the first cylindrical member 11. The second cylindrical members 23 thus turned steer the right and left tires 33 in the right direction $D_1$ and $E_1$, respectively. For the steering operation of the wheels in the left direction, the steering wheel 21 is turned reversely, i.e., in the left direction, so that the relay rod 17 moves in the left direction $B_2$, and each knuckle arm 13 turns in the left direction $C_2$, whereby the right and left tires 33 are steered in the left direction $D_2$ and $E_2$, respectively.

In the wheel supporting apparatus thus constructed, since the wheel supporting part 7 is disposed at the lower end of the strut type suspension and supports said wheel 32 or 33 to allow relative rotation to said strut type suspension 2, a distance between a wheel grounding point o and the wheel supporting part 7 is reduced. Therefore, a bending force which is caused by the forces applied to the wheels 32 and 33 in the lateral and longitudinal directions can be reduced. Thus, the wheel supporting part 7 can have a large rigidity.

Further, the center axis c of the strut type suspension 2 is disposed parallel to a rotation axis of the relative rotation of said wheel 32 or 33, i.e., the rotation axis for the steering operation, the road clearance can be reduced.

Since the wheel 32 or 33 is connected to a steering mechanism 13 through the velocity increasing gear 25 disposed at the wheel supporting part 7, the steering angle of the steering wheel is transmitted to the wheels 32 and 33 after the velocity thereof is increased by the velocity increasing gear 25. Thus, the wheels 32 and 33 can be steered at 90 degrees or more. Therefore, the wheel supporting apparatus thus constructed may be individually arranged at each of the front and rear wheels, in which case a small turn as well as parallel movement in a lateral direction can be allowed. Further, since the velocity increasing gear 25 is arranged at the lower end of the suspension 2, it is less affected by the elastic movement of the suspension 2. Therefore, with respect to the internal and external wheels 10 and 22 of the velocity increasing gear (25), it is not necessary to give much consideration to the vertical clearance between the vehicle frame 1 and them. This enables further reduction of the road clearance.

Since the velocity increasing gear 25 is formed of the internal gear wheel 10 connected to the knuckle arm 13 and the external gear wheel 22 connected to the wheel 32 or 33 and meshing with the internal gear wheel 10, the velocity increasing gear 25 can be advantageously compact and the non-suspended weight can be reduced. Therefore, the velocity increasing gear 25 can be disposed in a small space between the suspension 2 and the wheel 32 or 33 with a large degree of freedom. Further, owing to the reduction of the non-suspended weight, a comfortableness is improved.

Although particular preferred embodiments of the invention have been disclosed in detail for illustrative purpose, it will be recognized that other variations or modifications may be made without departing from the spirit and scope of the invention as claimed.

What is claimed is:

1. An electric wheel motor and supporting apparatus for rotatably supporting the electric wheel motor on a vehicle frame, comprising:
    a wheel motor including:
        a motor casing having an upper extension fixed thereto;
        a stator element fixed to said motor casing; and
        a rotor rotatably mounted within said motor casing;
    a wheel rotatably mounted on said motor casing; and
    output means for transmitting power from said wheel motor to said wheel, for rotatably driving said wheel;
    a strut type suspension including:
        a strut having an upper end supported by the vehicle frame, a lower end and a longitudinal axis extending between said upper and lower ends; and
        an arm member pivotally connecting said lower end of said strut to the vehicle frame;
    wheel motor support means, mounted on said lower end of said strut and rotatably connected to said upper extension, for rotatably suspending said wheel motor from said upper extension for rotation around a steering axis.

2. An electric wheel motor and supporting apparatus in accordance with claim 1 wherein said steering axis is parallel to said longitudinal axis.

3. An electric wheel motor and supporting apparatus in accordance with claim 1 wherein said wheel motor support means comprises:
    a gear set for multiplying and translating an angle through which a steering wheel is turned to the rotation of said wheel motor around said steering axis, said gear set comprising an internal gear wheel rotatably supported at said lower end of said strut for rotation responsive to the turning of a steering wheel; and
    an external gear wheel fixed to said upper extension of said motor casing and meshed with said internal gear wheel.

4. An electric wheel motor and supporting apparatus in accordance with claim 2 wherein said wheel motor support means comprises:
    a gear set for multiplying and translating an angle, through which a steering wheel is turned, to the rotation of said wheel motor around said steering axis, said gear set comprising an internal gear wheel rotatably supported at said lower end of said strut for rotation responsive to the turning of a steering wheel; and
    an external gear wheel fixed to said upper extension of said motor casing and meshed with said internal gear wheel.

5. An electric wheel motor and supporting apparatus in accordance with claim 1 wherein said output means comprises reduction gear means for reducing the power transmitted from said wheel motor to said wheel.

6. An electric wheel motor and supporting apparatus in accordance with claim 1 wherein said wheel motor is connected to and supported by the vehicle frame only through said wheel motor support means and wherein said wheel motor support means provides only a single point of support for said wheel motor at said lower end of said strut through said upper extension.

* * * * *